United States Patent [19]

Miller

[11] Patent Number: 4,514,379
[45] Date of Patent: Apr. 30, 1985

[54] CATALYTIC PROCESS FOR CONVERTING 2-OXAZOLIDINONES TO THEIR CORRESPONDING ALKANOLAMINES

[75] Inventor: Alex E. Miller, Placentia, Calif.

[73] Assignee: Union Oil Company of California, Los Angeles, Calif.

[21] Appl. No.: 508,719

[22] Filed: Jun. 28, 1983

[51] Int. Cl.³ .................... B01D 53/34; C07C 91/04
[52] U.S. Cl. .................................. 423/228; 423/229; 564/487
[58] Field of Search ............... 423/220, 226, 228, 229; 564/487

[56] References Cited

U.S. PATENT DOCUMENTS

| | | | |
|---|---|---|---|
| 2,701,750 | 2/1955 | Paulsen et al. | 423/229 |
| 2,785,045 | 3/1957 | Shen Wu Wan et al. | 423/229 |
| 3,226,866 | 8/1966 | Bally et al. | 423/229 |
| 3,338,664 | 8/1967 | Bally et al. | 423/223 |
| 3,347,621 | 10/1967 | Papadopoulos et al. | 423/226 |
| 3,535,260 | 10/1970 | Singh | 252/189 |
| 3,658,462 | 4/1972 | Van Scoy | 423/228 X |
| 3,965,244 | 6/1976 | Sykes, Jr. | 423/228 |
| 4,138,468 | 2/1979 | Kettner et al. | 423/228 |
| 4,205,050 | 5/1980 | Piehl et al. | 423/228 |
| 4,281,200 | 7/1981 | Snoble | 564/487 |
| 4,299,801 | 11/1981 | Lynn et al. | 423/228 |

FOREIGN PATENT DOCUMENTS

| | | | |
|---|---|---|---|
| 2382922 | 6/1978 | France | 423/228 |
| 1118687 | 7/1968 | United Kingdom | 423/228 |

Primary Examiner—Earl C. Thomas
Attorney, Agent, or Firm—Dean Sandford; Gregory F. Wirzbicki; Robert J. Baran

[57] ABSTRACT

This invention provides a process for recovering alkanolamines, e.g. diisopropanolamine, from their corresponding cyclic reaction products (e.g., oxazolidinones), which products are the result of the reaction of $CO_2$ and the alkanolamine, a situation commonly encountered in acid gas removal processes employing the alkanolamines alone or in combination with other liquids such as sulfolane (tetrahydrothiophene-1,1-dioxide). The process involves hydrolyzing the oxazolidinones in the presence of a small but catalytically effective amount of an amine, preferably from about 2 to 10 weight percent, based on 2-oxazolidinones. Preferably, the amine is the alkanolamine precursor of the corresponding 2-oxazolidinone.

21 Claims, 4 Drawing Figures

DIPA — OXAZOLIDONE HYDROLYSIS AT 400° F

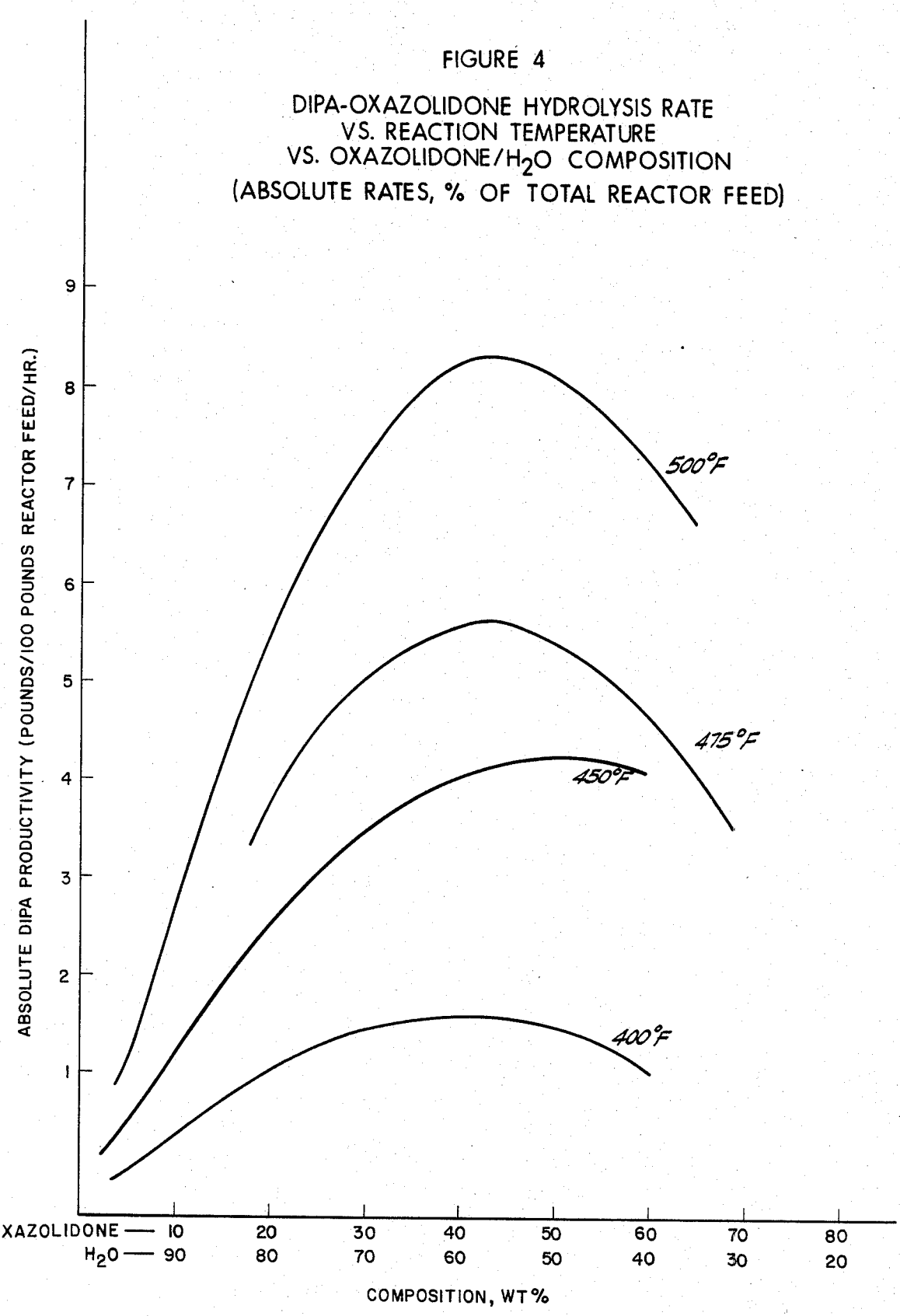

CATALYTIC PROCESS FOR CONVERTING 2-OXAZOLIDINONES TO THEIR CORRESPONDING ALKANOLAMINES

BACKGROUND OF THE INVENTION

1. Field of the Invention

The instant invention relates to a process for recovering the alkanolamines from the reclaimer bottoms of an acid gas scrubbing process wherein an alkanolamine absorption solution is utilized to absorb an acid gas, i.e. $CO_2$, from a gas stream and said absorption solution is regenerated by desorption of the $CO_2$ therefrom at conditions which result in a portion of the alkanolamine being converted into a 2-oxazolidinone.

2. Description of the Art

The removal of acid gases such as $H_2S$, $CO_2$, COS and the like from natural and synthetically-produced gases, including hydrogen, to improve their quality is a widely practiced technology employing many different processes based on chemical reactant and physical absorption characteristics of these acid gases with both liquids and solids. However, one of the most widely used processes employs alkanolamines alone or in combination with one or more chemical reactants or physical absorbents such as sulfolane. These products of the reaction as well as the absorbents of course must be regenerated, freed of the acid gas, and reused to absorb the acid gases from the natural or synthetic gas in a cyclical or continuous process. During regeneration, some of the alkanolamines undergo cyclization in the presence of and in reaction with $CO_2$ to the corresponding 2-oxazolidinone, which is difficult to convert back to the alkanolamine. The so-formed 2-oxazolidinone is a cyclic carbamate, which does not react with acid gases and therefore creates a waste product of unusable heavy materials which must be purged from the system to prevent their build-up.

U.S. Pat. No. 3,658,462 addresses itself to a process to regenerate the alkanolamines by hydrolysis in the presence of an inorganic base. However, in this process, 1 mole of inorganic carbonate per mole of waste oxazolidinone processed is formed. Thus, although the waste product is regenerated into the alkanolamines, the inorganic carbonate creates a separation and disposal problem.

In a similar fashion, UK Pat. No. 1,118,687 describes contacting alkanolamine-containing waste streams from acid gas purification processes with sufficient of an alkaline-reacting potassium compound, e.g., KOH, to cause separation into a purified amine-rich phase and an aqueous potassium salt containing phase.

French Brevet No. 2,382,922 addresses the same problem of recovering alkanol amines from oxazolidinone-containing acid gas treatment solutions, by heating such solutions in the presence of water at elevated temperature and pressure, e.g., 200°–300° C. and 10–60 atmospheres. U.S. Pat. No. 4,138,468 also describes the recovery of alkanolamines from acid gas treating solutions by heating at 140°–200° C. in the presence of a gross stoichiometric excess of water for an extended period of time, and generally at an elevated pressure. These patents do not utilize an inorganic base to convert the oxazolidinone into the alkanolamine precursor; however, the rate of conversion is slow and a long induction period is required before the conversion begins.

U.S. Pat. No. 4,281,200 somewhat overcomes the shortcomings of the above two approaches to recovering the alkanolamine from an oxazolidinone-containing solution, i.e. the problem of disposal of the salt obtained during the inorganic base catalyzed conversion of oxazolidinone into alkanolamine and the slow reaction rate and long induction period of the water hydrolysis of oxazolidinone in the absence of inorganic base. The process described in U.S. Pat. No. 4,281,200 still requires the addition of inorganic base to the oxazolidinone-containing residue; however, the inorganic base is added in a small but catalytic amount.

It would be advantageous to have a process for converting oxazolidinones into their alkanolamine precursors, without adding any inorganic materials, and not requiring long residence times or induction periods.

It is therefore one object of this invention to provide a process for recovering alkanolamines from oxazolidinone compounds by the inorganic, base-free hydrolysis of said oxazolidinone compounds.

It is another object of this invention to provide a process to recover alkanolamines from corresponding oxazolidinones wherein said process does not require long residence times or induction periods.

It is another object of this invention to optimize the balance between the rate of conversion of the oxazolidinone to the corresponding alkanolamine and the selectivity to such alkanolamine.

Other objects and advantages of the instant invention will become apparent from a careful reading of the specification below.

BRIEF DESCRIPTION OF THE INVENTION

In accordance with the present invention, it has been found that a small, but catalytically effective concentration of an amine in an aqueous mixture of reclaimer bottoms (usually containing about 80 to 90 percent, by weight, oxazolidinone), resulting from the regeneration of an alkanolamine absorption solution for the separation of $CO_2$ from a gas, will provide a rapid conversion of said oxazolidinone to its alkanolamine precursor and $CO_2$. The catalytic concentration of amine will reduce or eliminate the long induction period found in the prior art processes wherein oxazolidinone is hydrolyzed to alkanolamine in the absence of inorganic base.

The reclaimer bottoms are diluted with water to assist in the hydrolysis of the oxazolidinone compound to its alkanolamine precursor. The diluted mixture is heated to a temperature of at least 300° F., preferably from 350° to 450° F., and held thereat for a time sufficient to convert at least about 25 percent, preferably from 40 to 60 percent, by weight, oxazolidinone into the alkanolmine precursor. During the hydrolysis of the oxazolidinone, the $CO_2$ generated is continuously or intermittently removed to drive the reaction to completion.

Recovery of alkanolamine, from the hydrolyzed reclaimer bottoms, can be accomplished by vacuum distillation.

Good results have been observed when at least 1, and preferably from 2 to 10 weight percent, of an amine (based on the undiluted reclaimer bottoms) is provided in the hydrolysis solution of oxazolidinone. In one preferred embodiment the amine is the alkanolamine precursor of the oxazolidinone compound and is present in the reclaimed bottoms as alkanolamine remaining after the distillation of the regenerated alkanolamine absorption solution. Following the recovery of the alkanolamine, from the hydrolyzed solution by vacuum distillation, additional water of dilution can be added to the residue to provide, upon a second hydrolysis, a total conversion to the corresponding alkanolamine, equal to about 80 percent or more, of the total oxazolidinone feed.

Alternatively, the hydrolysis and distillation may be operated in a continuous mode with the residue of the distillation, after separation of a slipstream therefrom, combined with additional oxazolidinone (as reclaimer bottoms) and recycled to the hydrolysis step.

The oxazolidinones which are normally treated in accordance with the process of the present invention are those derived from the cyclization of $CO_2$ and alkanolamines, such as monoethanolamine, diethanolamine, monoisopropanolamine, or diisopropanolamine or mixtures thereof in an acid gas scrubbing process employing one or more of these amines with well-known acid gas absorbents such as sulfolane and the like.

BRIEF DESCRIPTION OF THE DRAWING

The invention will be more readily understood by reference to the drawings wherein:

FIG. 4 is a graph showing the relationship of the absolute production rate of alkanolamine by the hydrolysis of oxazolidinone and the degree of dilution of the reclaimer bottoms.

DETAILED DESCRIPTION OF THE INVENTION

Figure 1:
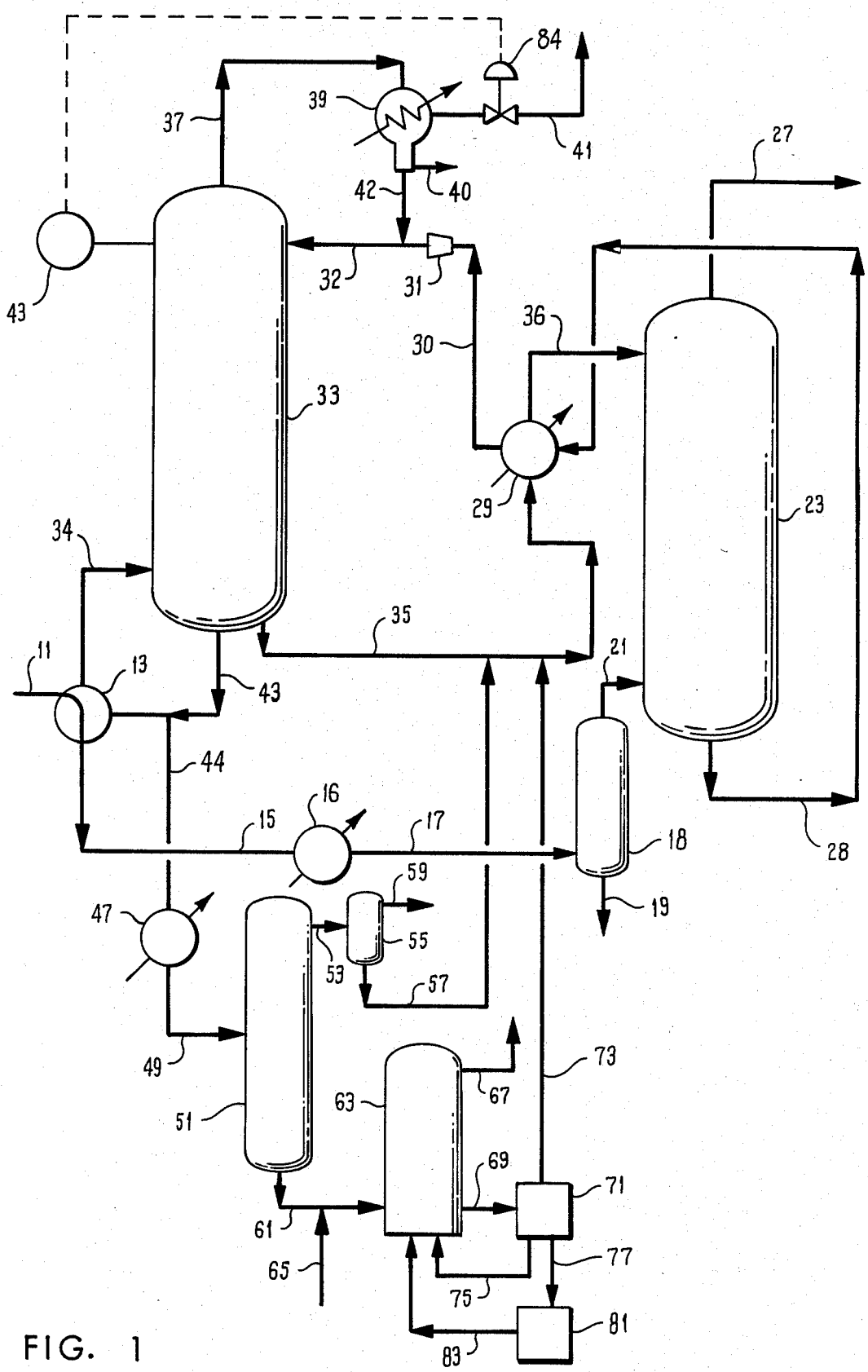
FIG. 1 is a schematic diagram illustrating the preferred embodiment of the process of the instant invention.

Referring now to FIG. 1 of the drawing, a $CO_2$-containing gas, e.g. natural gas or a synthetic gas derived by reformation of natural gas at an elevated temperature, e.g. a temperature of from 300° to 400° F., is passed from a source (not shown) through line 11 into a first heat exchanger 13 and subsequently through line 15 into a second heat exchanger 16 wherein the temperature of said $CO_2$-containing gas is reduced to a temperature of less than 200° F., e.g. from 120° to 150° F. The cooled $CO_2$-containing gas is then passed through line 17 into phase-separator 18, wherein any condensed water is separated therefrom.

The condensed water is removed from phase-separator 18 through line 19. The resulting dewatered $CO_2$-containing gas is passed through line 21 into an absorption zone or column 23 wherein it is counter-currently contacted with an absorption solution entering said absorption zone through line 36 and comprising 25 to 50 percent, preferably 40 to 45 percent, by weight, diisopropanol amine (or other alkanolamine) in sulfolane (or other solvent for said alkanolamine or other unwanted components present in the $CO_2$-containing gas). The $CO_2$ is substantially dissolved in said absorption solution and a gas comprising less than about one percent $CO_2$, by weight, exits absorption zone 23 through line 27.

The contacting of the absorption solution and the $CO_2$-containing gas fed into the absorption zone may take place in any suitable contacting tower. In such processes, the gaseous mixture, from which the $CO_2$ is to be removed, may be brought into intimate contact with the absorption solution using conventional means, such as a tower containing packing or bubble cap plates or sieve plates, or a bubble reactor.

In a preferred mode of practicing the invention, the absorption step is conducted by feeding the gaseous mixture into the base of the tower while fresh absorption solution is fed into the top. The gaseous mixture freed largely from $CO_2$ and other acid gases emerges from the top. Preferably, the temperature of the absorption solution during the absorption step is in the range from about 70° to about 200° F., and more preferably from 90° to about 150° F. The pressures during absorption may vary. Preferably the minimum operating pressure is at least about 300 p.s.i.g. The minimum partial pressure of the acid gas, e.g., $CO_2$, in the feed mixture is preferably at least 50 p.s.i.a. The contacting takes place under conditions such that the acid gas, e.g., $CO_2$, is absorbed by the absorption solution. Generally, the countercurrent contacting to remove the acid gases, e.g., $CO_2$, will involve a gas residence time of from 0.1 to 60 minutes, preferably 1 to 5 minutes.

The spent absorption solution containing absorbed $CO_2$ is passed through line 28 into heat exchanger 29 wherein it is heated by the effluent from the regeneration zone 33 as described below. The heated spent absorption solution is passed through line 30 into a pressure reducing zone 31, e.g. a pressure reduction valve, etc. and then regeneration zone 33 via conduit 32 to desorb $CO_2$ therefrom.

The spent absorption solution, comprising an aqueous mixture containing the alkanolamine, which is saturated or partially saturated with gases, such as $CO_2$, is regenerated so that it may be recycled back to the absorption zone. The regeneration or desorption is accomplished by conventional means, such as pressure reduction, to flash off the acid gases, e.g. $CO_2$, and heating. The regeneration zone may be a tower of similar construction to that used in the absorption step, or it may be of different design. The spent absorption solution is passed into the regeneration zone at or near the top of the tower, and steam is passed up the tower. As shown, the steam may be at least partially generated by heat exchange of the $CO_2$-containing gas in heat exchanger 13 with a portion of the regenerated absorption solution, which is separated from the returning stream and passed into heat exchanger 13 through line 43. The generated steam is passed from heat exchanger 13 into the regenerator through line 34. The temperature of the solution during the regeneration step is lower than that used in the absorbing step, the temperature at the top of tower 33 may vary from 150° to 250° F. and at the bottom from 200° to 300° F. The pressure in the regeneration zone 33 is lower than the pressure in the absorption zone. For example, a pressure in the range of from 5 to 25 p.s.i.g. may be used during regeneration of the spent absorption solution. The absorption solution, after being regenerated by the removal of at least a portion of the acid gases, may be recycled (by a recycle line, not shown) back to the absorption zone. Makeup absorption solution may be added as needed.

The regenerated absorption solution from regeneration tower 33 is returned to the absorption zone through line 35, heat exchanger 29 and line 36. Also recovered from the regeneration tower is a gas comprising substantially all of the $CO_2$ and some water which is removed overhead from regenerator 33 through line 37. The overhead is passed to condenser 39 wherein water is removed and recycled through line 42 or discarded through line 40. $CO_2$ and other noncondensible gases are passed from condenser 39 through line 41 and vented or treated to remove pollutants.

As shown, a pressure control 43, operating upon vent control valve 84, may be provided to regulate the operating pressure of the regeneration tower 33.

A slipstream of the regenerated absorption solution is passed through line 44, heat exchanger 47 and line 49 into vacuum reclaimer 51.

In the vacuum reclaimer, the diisopropanol amine (or other alkanolamine) is distilled and recovered overhead through line 53. The diisopropanolamine in the overhead is condensed in condenser 55 and returned to the process through line 57. $CO_2$ and water are removed overhead from condenser 55 through line 59 and discarded.

The reclaimer bottoms may comprise 80 percent or more, by weight, of an oxazolidinone derived by cyclization of the alkanol amine and $CO_2$. The remainder of the bottoms will include alkanolamine, other amines and neutral compounds.

It is critical to the instant process that at least a catalytically effective amount of amine (including the alkanolamine and the other amines) is provided in the reclaimer bottoms after separation of the major portion of alkanolamine overhead. If no amines are present, a long induction period is required to provide the amine catalyst by degradation of the oxazolidinone. After the amine catalyst concentration reaches about 2 percent, by weight of the oxazolidinone, the reaction rate rapidly increases to about 7 to 10 percent and remains constant until about 50 percent amine due to auto catalysis by the alkanolamine as it is formed (See FIG. 2C below.) Thus, at least 2 percent and preferably from about 2 to about 10 weight percent total amines is provided to catalyze the subsequent hydrolysis of the oxazolidinone in the reclaimer bottoms to the alkanolamine precursor. If less than 2 percent, by weight, total amines are present in the reclaimer bottoms, amine may be added to increase the total amines to from 2 to 10 weight percent; however, providing even one percent amine will reduce although not eliminate the induction period.

The amines that are catalytically effective in the hydrolysis of the oxazolidinone to the alkanolamine precursor will have at least one basic nitrogen atom. Nitrogen-containing compounds having nitrogen atoms that are adjacent to electron withdrawing groups, e.g. carbamates or carbamides are unsuitable. (It is noted that diisopropanolamine may by reaction with $CO_2$ form carbamates or carbamides, which are unsuitable for absorbing acid gases and catalyzing the hydrolysis of oxazolidinone.) In general amines including mono-, di- and tertiary amines that are soluble in the reclaimer bottoms hydrolysis mixture and do not volatilize during hydrolysis are preferred as catalysts for the hydrolysis of the oxazolidinone. The amines may contain functional groups that do not reduce the basicity of the amine nitrogen to a level where it is catalytically ineffective. For example, the most preferred amine catalyst (i.e., the alkanolamine precursor of the oxazolidinone) is substituted with hydroxyl groups. One skilled in the art may select a suitable amine catalyst for hydrolysis of the oxazolidinone in the reclaimer bottoms by simple testing to determine whether the induction period for the hydrolysis reaction is reduced or eliminated. If additional amine is required after distillation, preferably the alkanolamine precursor is added to the reclaimer bottoms.

The vacuum reclaimer may be operated at a temperature of from 300° to about 450° F. and a pressure of less than 300, preferably from 50 to 200 mm. Hg (absolute) to provide a reclaimer bottoms having the desired amount of amine catalyst remaining therein.

The reclaimer bottoms are passed through line 61 to hydrolyzer 63. The bottoms are diluted with from 0.5 to 1.5 parts, (and preferably about 1 part) water, per part reclaimer bottoms, to assist in the hydrolysis of the oxazolidinone compounds present therein. As shown, the water may be combined with the bottoms through line 65 from a source (not shown), with the water containing, if desired, the additional amine referred to above.

The diluted mixture is heated to a temperature of at least 300° F., preferably from 350° to 450° F., and most preferably from 400° to 450° F., for at least 5 hours, e.g. from 10 to 15 hours, to convert at least some, and preferably about 25 percent and more preferably from about 40 to about 60 percent of the oxazolidinone into its alkanolamine precursor. During such hydrolysis, $CO_2$ is generated and continuously or intermittently removed to drive the hydrolysis of the oxazolidinone to completion. The $CO_2$ is removed overhead through line 67 and discarded.

It has been unexpectedly found that the above most preferred hydrolysis temperature and dilution conditions provides the maximum absolute conversion rate of the 2-oxazolidinones in the reclaimer bottoms and optimum selectivity to the precursor alkanolamine, i.e., rate maximized vs. impurities minimized.

A lower temperature does not measurably increase the selectivity and provides a significantly lesser conversion rate. A higher temperature appears to result in the oxazolidinone breaking down, during hydrolysis, into a myriad of unknown oompounds whioh are difficult to separate from the alkanolamine, detract from the over-all yield, and increase waste disposal. Moreover, an additional separation step is undesirable in a process requiring the recycling of the alkanolamine to the acid gas absorption solution.

Another surprising and unexpected discovery was that the selectivity of the conversion of the oxazolidinone to alkanolamine increases with increasing dilution of the reclaimer bottoms with water. A large degree of dilution is unacceptable in a commercial process; however, when the hydrolysis temperature is maintained at from 450° F. or less, the selectivity is greater than 90 percent alkanolamine even when the reclaimer bottoms are diluted with no more than an equal weight of water. Moreover, dilution of the reclaimer with an equal weight of water provides the maximum absolute conversion of the oxazolidinone as shown below.

Finally, since the $CO_2$ is continuously or intermittently vented, while the water is returned to the hydrolysis step, the pressure remains essentially constant and is nearly equal to the vapor pressure of water at the temperature of hydrolysis.

The hydrolyzed reclaimer bottoms are passed to a vacuum distillation unit 71 through line 69 for distillation of the alkanolamine therefrom. The distilled alkanolamine may be returned to the acid gas absorption process through line 73. The distillation bottoms may be recycled to the hydrolyzer 63 by line 75.

A slipstream may be removed from the hydrolyzed reclaimer bottoms through line 77 and accumulated in holding tank 81. The accumulated slip-stream may be discarded or passed to hydrolyzer 63 by line 83 for separate treatment by hydrolysis and vacuum distillation to recover additional alkanolamine prior to disposal.

It has been found that the rate of conversion of the oxazolidinone rapidly decreases beyond an alkanolamine, e.g. diisopropanol amine, conversion of about 60 percent. Beyond 60 percent conversion reaction selectivity also worsens. Therefore the maximum conversion is preferably maintained at from about 40 to about 60 percent. To achieve a greater over-all yield of alkanolamine from the hydrolysis of oxazolidinone, the process of the instant invention may be operated as follows:

Continuous Recycle Process

In the process illustrated in FIG. 1, a 20 percent slipstream is removed from the hydrolyzed reclaimer bottoms through line 77 and the remainder is recycled to the hydrolyzer 63. By operation in this manner a yield of 70 to 80 percent may be achieved.

Two Pass Continuous Process

The oxazolidinone-containing reclaimer bottoms are passed through the hydrolysis zone 63 and vacuum reclaimer 71 twice, with the conversion in the hydrolysis zone maintained at about 50 percent per pass. The hydrolyzed reclaimer bottoms from the second pass is discarded. In this mode of operation the over-all yield is 70 to 80 percent.

Two Pass Batch Process

The oxazolidinone may be hydrolyzed and distilled in two batch operations to obtain an over-all conversion of 70 to 80 percent.

Diminishing rate and increasing impurity accumulation preclude exhaustive hydrolysis and alkanolamine recovery. Also the viscosity of hydrolyzed reclaimer bottoms increases and may become excessive for practical handling at higher alkanolamine conversions.

The invention is further illustrated by the following examples which are illustrative of various aspects of the invention, and are not intended as limiting the scope of the invention as defined by the appended claims.

GENERAL PROCEDURE

The hydrolysis experiments are carried out in a stirred one-gallon autoclave unit. The reactor is charged with 1500–1750 grams of the reclaimer bottoms from a $CO_2$ absorption process, which comprises 88 percent 5-methyl-N-(2-hydroxypropyl)-2-oxazolidinone (the cyclic derivative of diisopropanol amine and $CO_2$), 2 percent diisopropanol amine, 5 percent other amines and 3 percent other neutral compounds. An equal weight of water is added to the autoclave unit and the resulting mixture is purged with nitrogen to remove oxygen from the system. The reactor vent is then sealed and heat source is turned on with thermocontrollor preset to desired temperature. About 1 hour is required to reach operating temperatures. As soon as desired temperature is attained, the overhead vent is opened to permit continuous outflow of steam along with entrained $CO_2$ product, thus not allowing $CO_2$ to accumulate in the reactor. A water feed pump is also turned on and the water inflow to the reactor adjusted to match vapor condensate rate, so that water balance in reactor solution is maintained. Downstream of the vapor condensate accumulator, a wet-test meter measures noncondensable gas production rate ($CO_2$). The reactor liquid phase is sampled at appropriate time intervals by withdrawing liquid through a cooled sampling coil.

The hydrolysis reaction can be monitored by gas chromatographic or acid titration analysis of the liquid phase samples. Wet-test meter measurement of the $CO_2$ effluent downstream of condensate knockout may also be used to follow the progress of reaction.

The vapor condensate contains very little organic material (typically 1 percent or less diisopropanol amine or equivalent by titration). About half of the condensate organic is diisopropanol amine, the remainder other volatile amines. Since the condensate contains so little substrate material, it need not be recycled to the reactor.

EXAMPLE 1

Figure 2:
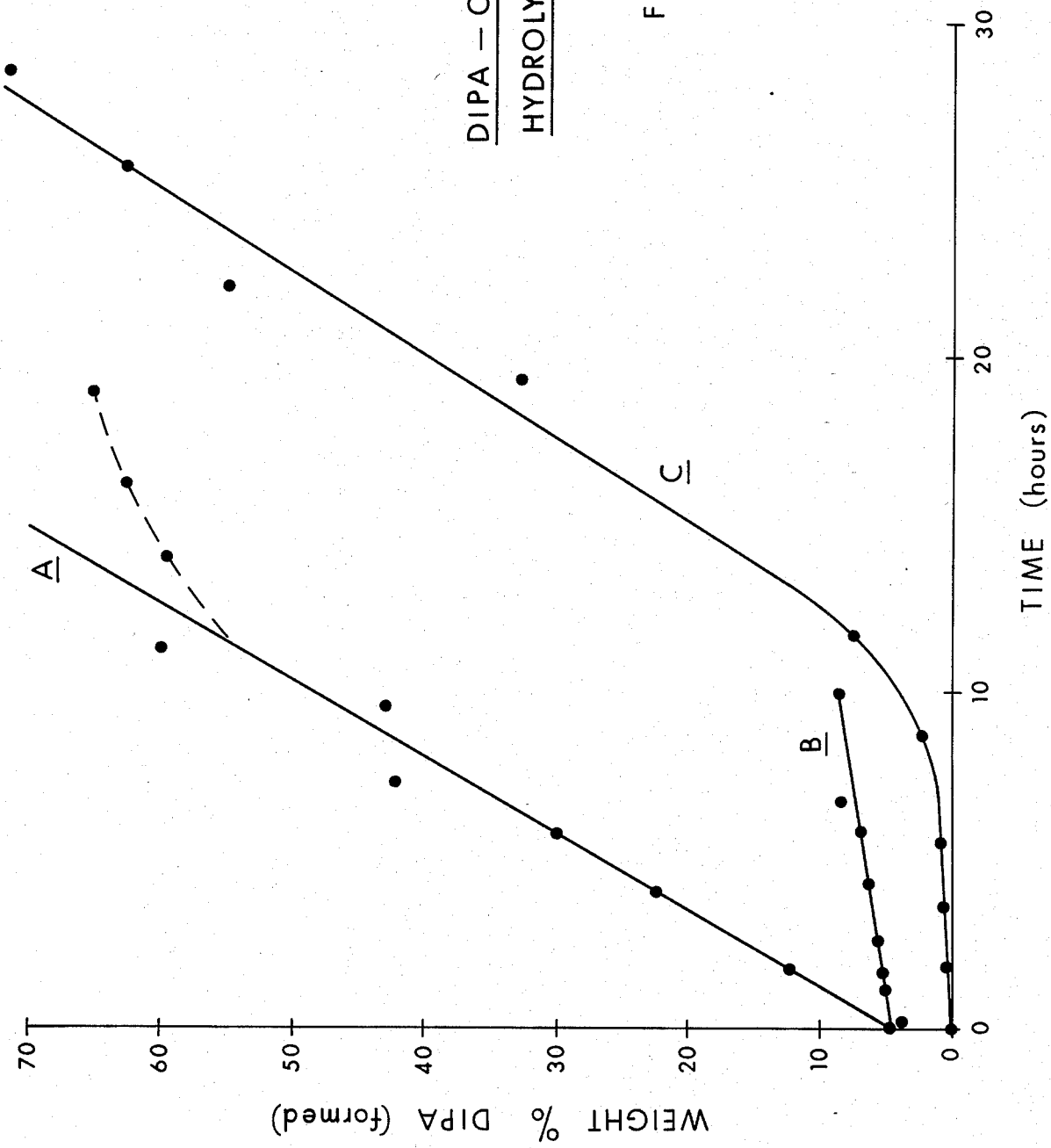
FIG. 2 is a graph comparing the rate of hydrolysis of oxazolidinones in the reclaimer bottoms of a $CO_2$ absorption process, in the presence and absence of a catalytic concentration of amines.

This example demonstrates that the amine impurities and the diisopropanol amine left in the reclaimer bottoms after distillation of the majority of the diisopropanolamine overhead will catalyze the hydrolysis of the oxazolidinone compounds present in the reclaimer bottoms to diisopropanol amine. In FIG. 2, hydrolysis rate profiles of untreated reclaimer bottoms (A), reclaimer bottoms pre-neutralized to pH 6 with $H_2SO_4$ (B), and reclaimer bottoms pre-treated with an acidic cation exchange resin to remove all amines (C) are compared. Neutralization of the amine content with acid (B) clearly inhibits the hydrolysis of the oxazolidinone compound. Removal of the amines by cation exchange (C) causes a prolonged induction period, after which the hydrolysis rate slope is virtually identical to that of the untreated bottoms (A). In (C), it is apparent that the addition of about 2 to 10 percent diisopropanol amine (or the same equivalent of other amines) effectively eliminates the induction period. When 7 wt. % amine, in the form of diisopropanol amine is added back to cation exchange-treated reclaimer bottoms (C), hydrolysis assumes rate profile (A) from the outset. All of the above observations relating to amine catalysis hold true for both dilute (1.6 wt. % reclaimer bottoms) and concentrated (50 wt % reclaimer bottoms) hydrolysis mixtures.

In summary, it has now been discovered: (1) that the uncatalyzed hydrolysis of oxazolidinone-containing reclaimer bottoms is excruciatingly slow, (2) that free amines present in such reclaimer bottoms catalyze the initial hydrolysis, and (3) that the hydrolysis is subsequently auto-catalyzed by diisopropanol amine as it is formed.

EXAMPLE 2

A three-stage series of alternating reclaimer bottoms hydrolysis-distillation treatments is performed at 400° F. (the reclaimer bottoms being diluted with an equal weight of water) to simulate effects of exhaustive recycling in the commercial unit and to determine realistic diisopropanol amine yield limits. Compositional data (gas chromatography, dry basis) are summarized in Table I. Each hydrolysis is continued for 10 to 12 hours, sufficient time in each case to hydrolyze about one-half of the oxazolidinone present. Diisopropanol amine formation rates were 4.0, 3.7, and 2.4 wt. %/hr (GC, dry basis) for the three successive stages. The rate of diisopropanol amine formation, as a percentage of initial oxazolidinone in each stage hydrolysis feed, were 4.6, 4.9, and 4.6 wt %/hr. Due to diisopropanol amine rate falloff with dwindling oxazolidinone in the hydrolysis feed and concomitant relative increase in impurity accumulations, the total yield of DIPA (diisopropanol amine) is generally limited to from 70 to 80 percent.

In the successive batch hydrolyses, diisopropanol amine formation selectivity remained good throughout about 90 to 95 percent.

In Table I DIPA=diisopropanol amine; DIPA-oxazolidinone=oxazolidinone compound; and DIPA-oxazolidone Botts=reclaimer bottoms; GC=gas chromatography.

TABLE II

DIPA-OXAZOLIDINONE HYDROLYSIS

| Temp., °F. | DIPA Formation Rate, Wt. % DIPA/Hr[a] | DIPA Selectivity, %[b] |
|---|---|---|
| 500 | 17.4 | 78.7 |
| 475 | 13.4 | 82.8 |
| 450 | 9.7 | 88.2 |
| 400 | 3.4 | 91.7 |
| 400 | 4.2 | 95.0 |
| 400 | 4.2 | 93.9 |
| 350 | 1.3 | 94.7 |

[a]Slope of "zero-order" rate plot of DIPA concentration (wt. % DIPA, dry basis by gas chromatography) vs. time.
[b]Represents purity retention, i.e., % of DIPA-oxazolidinone converted to DIPA, the remainder being impurities.

TABLE I

THREE-STAGE RECYCLE HYDROLYSIS/DISTILLATION DATA

| | Components, wt. % GC, Dry Basis[a] | | | | | |
|---|---|---|---|---|---|---|
| | DIPA | DIPA-Oxazolidinone | $I_1$[b] | $I_2$[b] | $I_3$[b] | Totals |
| Starting DIPA-oxazolidinone | | | | | | |
| Botts | 2.8 | 86.3 | 0.2 | 3.0 | 7.8 | 100 |
| I. First Stage Hydrolysis | | | | | | |
| Product[c] | 38.6 | 51.0 | 0.2 | 3.4 | 6.8 | 100 |
| Distillation 1- | | | | | | |
| Overhead | 35.0 | 4.9 | 0.2 | 1.8 | 0.2 | 42.1 |
| Botts | 4.8 | 43.3 | 0.0 | 1.9 | 8.0 | 58.1 |
| II. Second Stage Hydrolysis | | | | | | |
| Product[c] | 25.1 | 19.7 | 0.2 | 3.7 | 9.4 | 58.1 |
| Distillation 2- | | | | | | |
| Overhead | 23.1 | 3.4 | 0.1 | 1.8 | 0.4 | 28.8 |
| Botts | 1.6 | 15.4 | 0.0 | 1.9 | 10.4 | 29.3 |
| III. Third Stage Hydrolysis | | | | | | |
| Product[c] | 10.6 | 6.5 | 0.0 | 3.3 | 8.8 | 29.3 |
| Distillation 3- | | | | | | |
| Overhead | 10.5 | 0.9 | 0.0 | 1.2 | 0.5 | 13.1 |
| Botts | 0.2 | 5.2 | 0.0 | 1.9 | 9.0 | 16.3 |
| Cumulative Overhead | | | | | | |
| Stage 1 | 35.0 | 4.9 | 0.2 | 1.8 | 0.2 | 42.1 |
| 2 | 58.1 | 8.3 | 0.3 | 3.6 | 0.6 | 70.9 |
| 3 | 68.6 | 9.2 | 0.3 | 4.8 | 1.1 | 84.0 |
| Cumulative Overhead | | | | | | |
| Stage 1 | 4.8 | 43.3 | 0.0 | 1.9 | 8.0 | 58.1 |
| 2 | 1.6 | 15.4 | 0.0 | 1.9 | 10.4 | 29.3 |
| 3 | 0.2 | 5.2 | 0.0 | 1.9 | 9.0 | 16.3 |

[a] Based on initial 100 parts DIPA-oxazolidinone reclaimer feed to hydrolysis unit.
[b] $I_1$ total wt. impurities with GC retention time less than DIPA.
$I_2$ total wt. impurities with GC retention time between DIPA and DIPA-oxazolidinone.
$I_3$ total wt. impurities with GC retention time beyond DIPA-oxazolidinone.
[c] DIPA formation rates:

| | wt. % DIPA/hr (GC, dry basis) |
|---|---|
| Stage 1 | 4.0 |
| Stage 2 | 3.7 |
| Stage 3 | 2.4 |

EXAMPLE 3

This example demonstrates that the optimum temperature for the hydrolysis of the oxazolidinone-containing reclaimer bottoms is between 400° and 450° F. Within this range the rate of hydrolysis is acceptably rapid, from a commercial stand point, while the selectivity to alkanolamine is about 90 percent or greater. A lower temperature (350° F.) d does not significantly increase the selectivity and the rate of conversion is very slow. At temperatures of more than 450° F. the selectivity, unacceptably, decreases to about 80 percent or less. This data are summarized in Table II. The hydrolysis mixture in these experiments consists of 50 weight percent reclaimer bottoms and 50 weight percent water.

EXAMPLE 4

Figure 3:
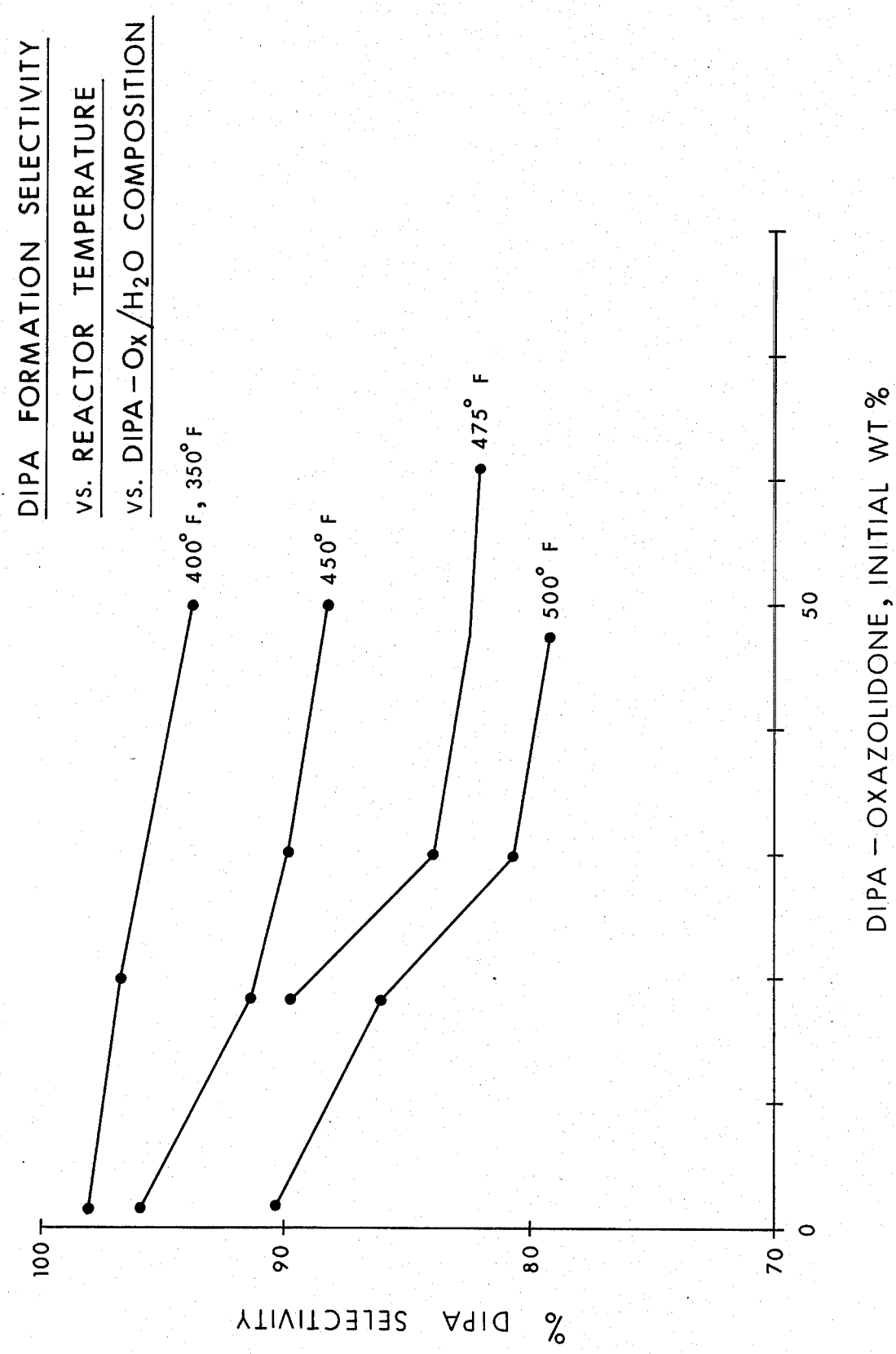
FIG. 3 is a graph showing the relationship of selectivity of the hydrolysis of an oxazolidinone-containing reclaimer bottoms to the precursor alkanol amine, to the temperature of hydrolysis and the degree of dilution of such reclaimer bottoms with water.

This example demonstrates that the degree of dilution of the oxazolidinone-containing reclaimer bottoms, as well as the hydrolysis temperature, effects selectivity to the alkanolamine. This experiment is carried out as described above in the GENERAL PROCEDURE except that the amount of water utilized to dilute the reclaimer bottoms is varied to provide the sample compositions shown in FIG. 3. As can be seen from FIG. 3, the selectivity of the hydrolysis of oxazolidinone to the corresponding alkanolamine is greater than 90 percent over the range of infinity to 1 part water, per part reclaimer bottoms, at a hydrolysis temperature of from 350° to 450° F. At a hydrolysis temperature of 475° F.

or greater, a selectivity of greater than 90 percent can be obtained only at a dilution of 4 parts or more water per part reclaimer bottoms. This degree of dilution is obviously not preferred in a commercial process.

EXAMPLE 5

This example demonstrates that the absolute production rate of diisopropanolamine by hydrolysis of the oxazolidinone is maximized with an initial oxazolidinone composition of about 50 percent. Thus the reclaimer bottoms, which are usually at least about 80 percent oxazolidinone are preferably diluted with an equal weight of water. This experiment was carried out in accordance with the GENERAL PROCEDURE except the amount of water utilized to dilute the reclaimer bottoms is varied to provide the sample compositions shown in FIG. 4. The absolute diisopropanol amine production rate is defined as the actual amount of DIPA formed per unit reactor solution volume per hour.

While particular embodiments of the invention have been described, it will be understood, of course, that the invention is not limited thereto since many obvious modifications can be made and it is intended to include within this invention any such modifications as will fall within the scope of the appended claims.

I claim:

1. In a process for converting a 2-oxazolidone compound to its alkanolamine precursor, by the hydrolysis reaction of said oxazolidinone compound to carbon dioxide and its alkanolamine precursor in an aqueous solution, the improvement comprising eliminating the induction period of said hydrolysis by providing at least 2 percent, by weight of an amine in said aqueous solution.

2. The process of claim 1 wherein said alkanolamine precursor is diisopropanolamine.

3. The process of claim 2 wherein the source of said oxazolidinone compound is the reclaimer bottoms from a gas treating process employing a mixture of sulfolane and diisopropanolamine to separate carbon dioxide from a gas stream comprising same.

4. The process of claim 3 further comprising distilling the diisopropanolamine so produced from the aqueous solution and then adding more of the oxazolidinone compound and repeating the hydrolysis reaction.

5. The process of claim 1 wherein said hydrolysis reaction is carried out by heating said aqueous solution to a temperature of at least 300° F. and continuously venting-off the carbon dioxide.

6. The process of claim 5 wherein said amine is the alkanolamine precursor.

7. The process of claim 1 wherein said hydrolysis reaction is carried out by heating said aqueous solution to a temperature of from 400° to 450° F.

8. The process of claim 3 wherein said reclaimer bottoms are diluted with from 0.5 to 1.5 parts water per part reclaimer bottoms and the resulting aqueous solution is heated to a temperature of from 400° to 450° F. to hydrolyze the oxazolidinone to the alkanol amine.

9. The process of claim 8 wherein said catalytic amount of an amine comprises from about 2 to about 10 percent, by weight, based on said oxazolidinone.

10. The process of claim 9 wherein said reclaimer bottoms are diluted with about 1 part water per part reclaimer bottoms.

11. A process for removing $CO_2$ from a gas stream which comprises:

(a) contacting said gas stream with an absorption solution comprising an alkanolamine to provide a spent absorption solution comprising absorbed $CO_2$, (b) desorbing $CO_2$ from said spent absorption solution to provide a regenerated absorption solution comprising said alkanolamine and an oxazolidinone compound derived from said alkanol amine and $CO_2$, (c) passing a slip-stream of said regenerated absorption solution to a reclaimer and therein distilling overhead said alkanolamine and recovering a bottoms comprising said oxazolidinone compound and said alkanolamine, said alkanolamine being present in said bottoms in an amount effective to eliminate the induction period of the hydrolysis of said oxazolidinone compound, (d) passing said bottoms to a hydrolysis zone and therein heating said bottoms to hydrolyze said oxazolidinone compound to its alkanolamine precursor, and (e) passing said hydrolyzed bottoms to a distillation zone and therein distilling overhead said alkanolamine and recovering a residue comprising said oxazolidinone compound and compounds having a boiling point higher than said oxazolidinone compound.

12. The process of claim 11 wherein a portion of said residue is divided therefrom and recycled to said hydrolysis zone.

13. The process of claim 12 wherein said bottoms is mixed with an equal weight of water in said hydrolysis zone.

14. The process of claim 13 wherein said alkanolamine is diisopropanolamine.

15. The process of claim 14 wherein the source of said oxazolidinone compound is the reclaimer bottoms from a gas treating process employing a mixture of sulfolane and diisopropanolamine to separate carbon dioxide from a gas stream comprising same.

16. The process of claim 15 wherein said diisopropanolamine is present in an amount of from 2 to 10 weight percent, based on said oxazolidinone compound, in said hydrolysis zone.

17. The process of claim 12 wherein said bottoms are diluted with from 0.5 to 1.5 parts water in said hydrolysis zone.

18. The process of claim 17 wherein said diluted bottoms is heated to a temperature of from 400° to 450° F. to hydrolyze said oxazolidinone to alkanolamine.

19. In a process for converting a 2-oxazolidinone compound to its alkanolamine precursor, by the hydrolysis reaction of said oxazolidinone compound to carbon dioxide and its alkanolamine precursor in an aqueous solution, the improvement comprising a catalytically effective concentration of amine in said aqueous solution for eliminating the induction period said hydrolysis reaction.

20. The process of claim 11 wherein said overhead from steps (c) and (e) is recycled to said process as said absorption solution.

21. A process for converting a 2-oxazolidinone compound to its alkanolamine precursor, by the hydrolysis reaction of said oxazolidinone compound to carbon dioxide and its alkanolamine precursor in an aqueous solution, which comprises providing at least 2 percent, by weight, of an amine in said aqueous solution.

* * * * *